Aug. 14, 1934.  C. J. SCHROEDER  1,970,023
LATHE
Filed April 7, 1931  4 Sheets-Sheet 2
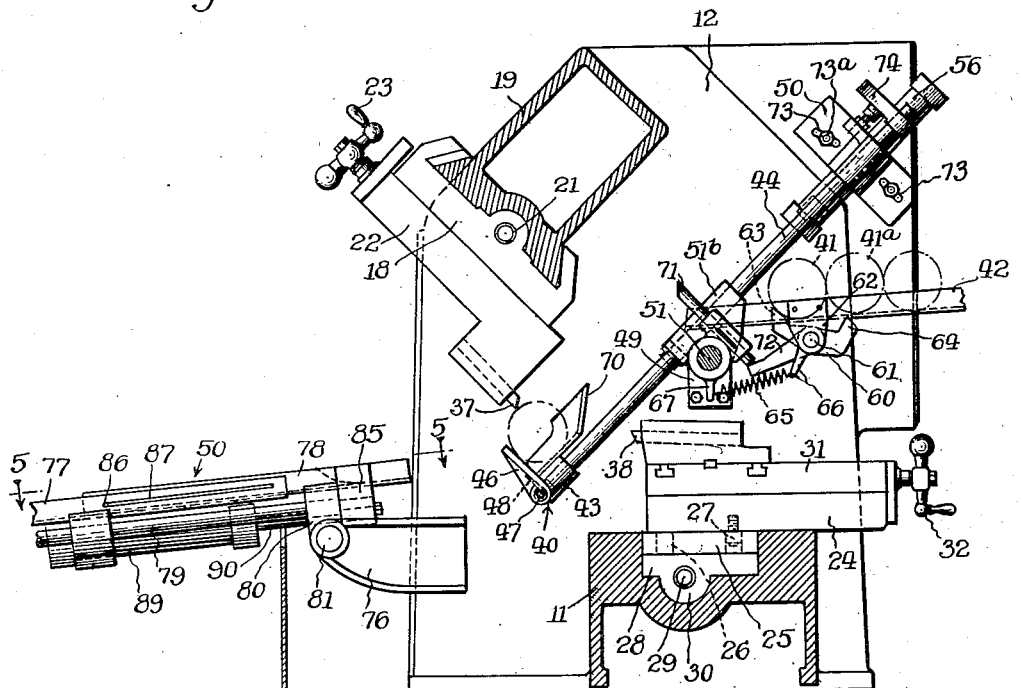
Fig. 2.
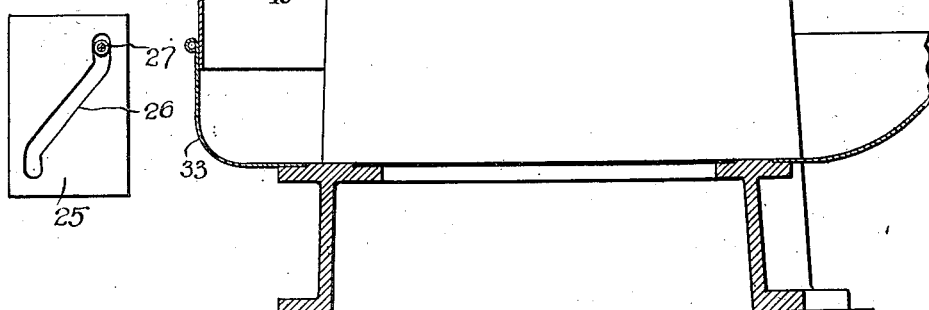
Fig. 2ª
Inventor:
Clement J. Schroeder,
By [signature] Atty.

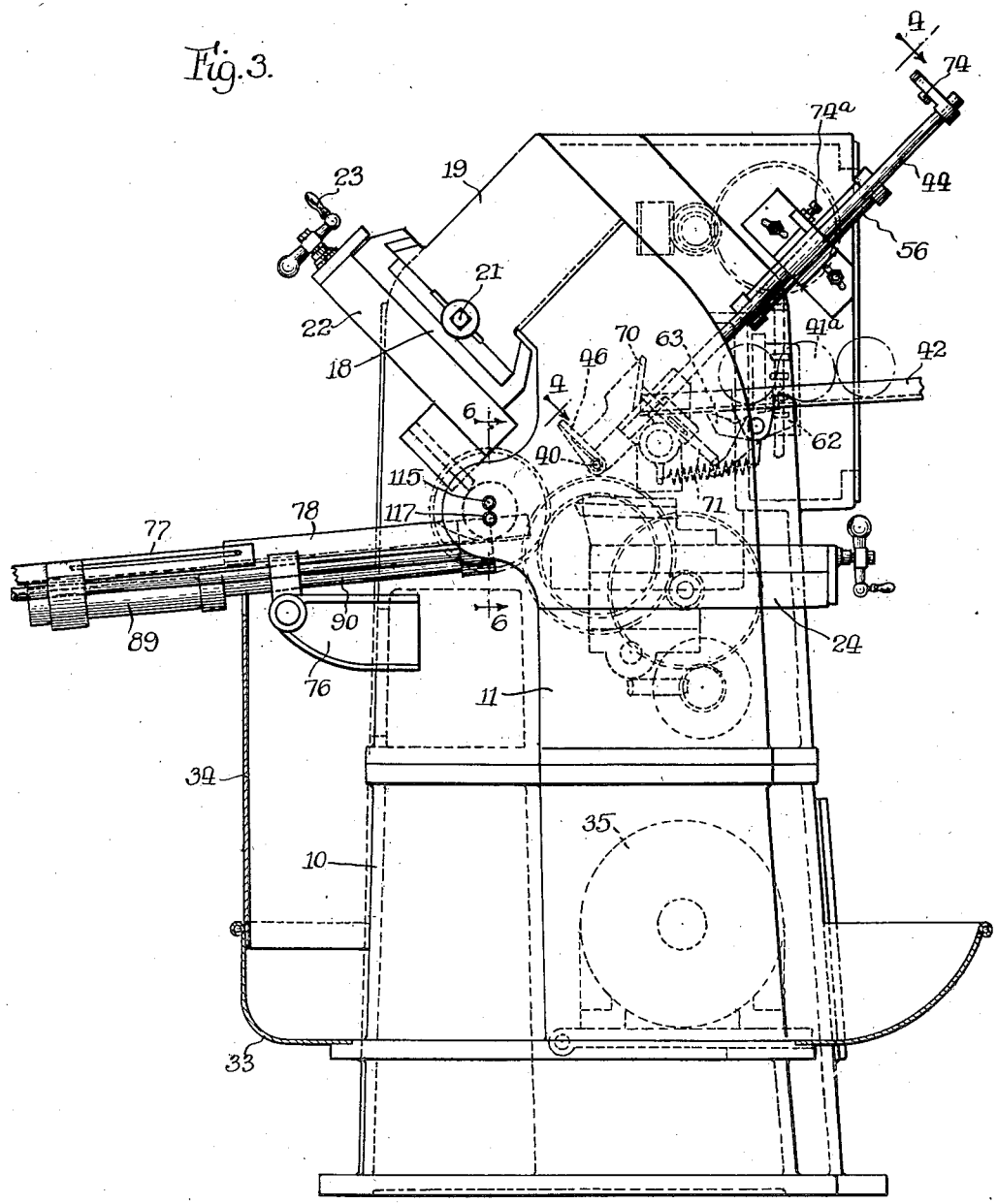

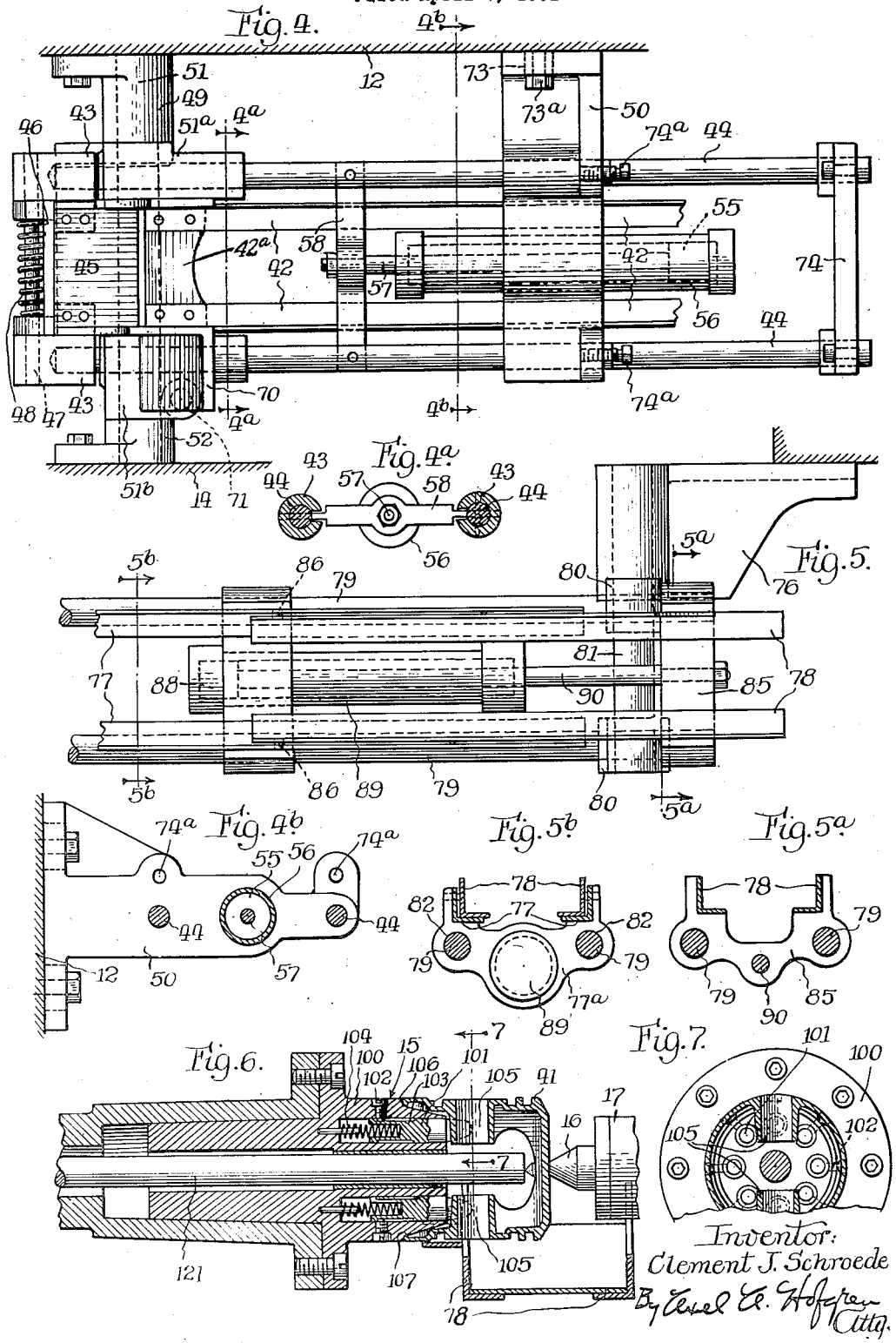

Patented Aug. 14, 1934

1,970,023

UNITED STATES PATENT OFFICE 1,970,023

LATHE

Clement J. Schroeder, Rockford, Ill., assignor to Sundstrand Machine Tool Co., Rockford, Ill., a corporation of Illinois Application April 7, 1931, Serial No. 528,361

30 Claims. (Cl. 82—2)

This invention relates generally to lathes and more particularly to a lathe embodying automatic means for loading work pieces onto the work spindles and for removing finished work pieces therefrom.

The general object of the invention is to provide a new and improved lathe embodying means for automatically loading work blanks onto the work spindle and for removing finished work pieces therefrom, together with novel means for supporting the tools so as to provide a maximum amount of space for the loading and unloading mechanism and for the discharge of chips and coolant.

Another object of the invention is to provide a lathe having the tool supports and bed in such relation that the chips and coolant may readily fall into a large reservoir provided in the base without becoming caught on the tool supports.

Another object is to provide such a lathe in which the cutting tools may be conveniently inspected.

Another object is to provide a lathe embodying a plurality of independent tool supports adapted to carry tools for movement longitudinally and transversely of the work, all of the tool supports being in compression during the cutting operations.

Further objects will become apparent from the following detailed description taken in connection with the accompanying drawings, in which:

Fig. 2 is a transverse section taken approximately along the line 2—2 of Fig. 1.

Figure 1:
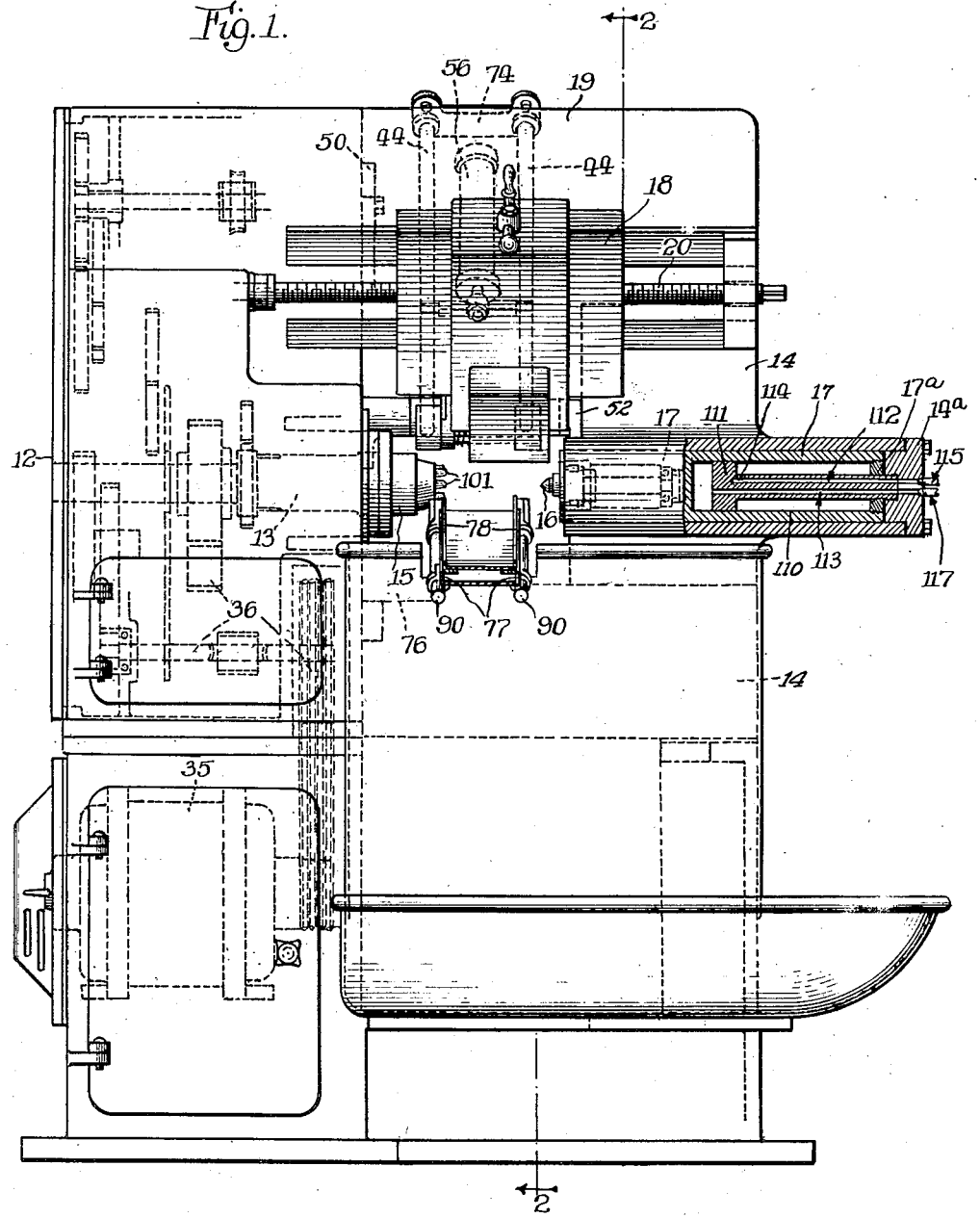
Fig. 1 is a front elevation of a lathe embodying the preferred form of the invention.

Fig. 2ᵃ is a detail view of the cam for actuating the rear tool support.

Fig. 3 is an end view looking at the right hand end of Fig. 1.

Fig. 4 is a plan view of the loading mechanism taken approximately along the line 4—4 of Fig. 3.

Fig. 4ᵃ is a section approximately along the line 4ᵃ—4ᵃ of Fig. 4.

Fig. 4ᵇ is a section approximately along the line 4ᵇ—4ᵇ of Fig. 4.

Fig. 5 is a plan view of the unloading mechanism taken approximately along the line 5—5 of Fig. 2.

Fig. 5ᵃ is a section along the line 5ᵃ—5ᵃ of Fig. 5.

Fig. 5ᵇ is a section along the line 5ᵇ—5ᵇ of Fig. 5.

Fig. 6 is a fragmentary longitudinal section along the spindle axis approximately on line 6—6 of Fig. 3.

Fig. 7 is a section along the line 7—7 of Fig. 6.

While I have shown in the drawings and shall hereinafter describe in detail the preferred embodiment of the invention as embodied in a lathe particularly adapted to operate on pistons for internal combustion motors, it is to be understood that I do not thereby intend to limit the invention to the particular construction and arrangement shown, it being contemplated that various changes may be made by those skilled in the art to adapt the invention to other machines and work without departing from the spirit and scope of the invention as expressed in the appended claims.

In the form chosen for purposes of disclosure, the invention is embodied in a lathe having a hollow base 10, a bed 11 extending longitudinally along the rear portion of the base, a headstock 12 formed integrally with the bed and extending upwardly from the left-hand end of the base (Fig. 1), a work support or spindle 13 rotatably mounted in the headstock, and a tailstock 14 at the right-hand end of the bed (Fig. 1). The work spindle 13 carries a work driver 15 (Figs. 1 and 6) which, together with a center 16 rotatably mounted on a longitudinally slidable sleeve 17 in the tailstock, is arranged to form a work supporting and driving means. A tool support 18 is slidably mounted on an overarm 19 extending between the upper end of the headstock and the upper end of the tailstock, and is adapted to be reciprocated longitudinally of the spindle by means including a feed screw 20 which is rotatably mounted on the overarm and engages a nut 21 (Fig. 2) on the tool support. A tool slide 22 is mounted on the support 18, and is adjustable transversely of the work spindle by means including a manually operable device 23. A second tool support 24 is slidably mounted on the bed 11 for movement transversely thereof and is arranged to be actuated by means of a plate cam 25 (Figs. 2 and 2ᵃ) which is movable longitudinally of the bed and has a slot 26 in which a roller 27 on the tool support engages. This cam is mounted on a slide 28 and is arranged to be reciprocated longitudinally of the bed by means of a screw 29 engaging a nut 30 on the slide. The tool support 24 also has a tool slide 31 mounted thereon which is adjustable transversely of the bed by means including a manually operable device 32.

As illustrated most clearly in Fig. 2, the portion of the bed 11 which is between the headstock and tailstock is relatively narrow compared with the headstock, and is positioned to the rear of the axis of the work supporting means. This provides a large amount of space in front of the bed so that chips from the work may fall directly down into the large hollow base 10 and a chip pan 33 secured thereto. Preferably a guard 34 is provided along the front of the machine extending upwardly from the forward edge of the pan 33 to prevent any chips or coolant from flying out onto the floor. By so forming the bed and positioning the rear tool supporting portion rearwardly of the work axis, there is practically nothing for the chips to catch on during the cutting operation, since at that time the tool support 24 is in its forward position and covers the bed.

The work supporting spindle 13 is preferably driven in a clockwise direction (Figs. 2 and 3) by a motor 35 and intermediate gearing designated generally as 36. Thus the pressure on a tool 37 carried on the work support 18 and also on a tool 38 carried on the work support 24 is toward the supporting arm 19 and bed 11, respectively, with the result that the tool supports are both in compression during the cutting operations. This arrangement of the frame elements and tool supports not only provides a rigid backing for the tools so as to prevent chatter, but also permits of convenient inspection of the tools and work.

The invention in its preferred form also embodies novel mechanism for loading or transferring work blanks onto the work supporting means, and for automatically unloading or removing finished work pieces upon the completion of the cutting operations. As illustrated most clearly in Figs. 2 to 4b, the mechanism for loading the work blanks onto the work supporting means comprises a carrier designated generally as 40, which is slidably mounted for reciprocation along an inclined line intermediate the rear tool support 24 and overarm 19 and is adapted to be moved from an upper or receiving position, such as illustrated in Fig. 3, to a lower or loading position, as shown in Fig. 2. When in its upper position, this carrier 40 is adapted to receive a work blank 41 from a slightly inclined pair of angle guides forming a supply chute 42, and when in its lower position the carrier is arranged to aline a work blank thereon with the work driver 15 and tailcenter 16. A plate 42a is preferably secured intermediate the lower ends of the angles of the supply chute 42 for spacing the angles and reinforcing the chute.

The work carrier 40 comprises a pair of members 43 (Figs. 2, 3 and 4), secured to the lower end of a pair of slidably mounted rods 44, a plate 45 riveted on the upper surfaces of said members to form a short runway, and a stop member or plate 46 which is hinged to the members 43 by means of a pin 47. The stop member is normally maintained in a position substantially perpendicular to the plate 45 by means of a coiled spring 48 which holds the plate in abutment with the end of said plate. Thus the plate 45 and plate 46 normally form a V-shaped carrier for transferring work blanks from the supply chute 42 to the work supporting means. The rods 44 are supported on a lower bracket 49 and an upper bracket 50 for reciprocatory movement along a line substantially bisecting the angle between the tool supports. The bracket 50 is secured to the headstock 12, as shown in Figs. 4 and 4b. The lower bracket 49 is also secured to the headstock and has a supporting shaft 51 projecting horizontally therefrom which extends through members 51a and 51b and is secured at its other end to the tailstock 14 by means of a bracket 52. The members 51a and 51b are rigid with the stationary shaft 51 and have bores therethrough in which the rods 44 slide.

As illustrated herein, the work blank carrier 40 is arranged to be reciprocated by means of a pressure fluid operated motor comprising a piston 55 (Figs. 4 and 4b) which is mounted in a cylinder 56 secured to the bracket 50, and is connected to the rods 44 by means of a piston rod 57 and a cross head 58. During its reciprocation the work blanks 41 are arranged to be released one-by-one and permitted to roll down the chute 42 onto the work blank carrier.

Normally the work blanks are held back in the chute by means of a lever 60 which is secured to a short shaft 61 pivotally mounted beneath the chute by means of a pair of brackets 62. The lever 60 has a stop finger 63 at its forward end and a stop finger 64 at its rear end, and is normally held in the position shown in Fig. 2 by means of a spring 65 which is secured at one end to an arm 66 on the shaft 61 and at its other end to a lug 67 on the member 51b. In this position the stop finger 63 extends up between the guides forming the chute 42 and engages the lowermost work blank while the work blank carrier is moving down to load a work blank onto the work supporting means. When the work blank carrier is returned to its upper position, an inclined cam plate 70, secured to one of the members 43, engages one end of a plunger 71 which is slidably mounted in the member 51b for movement perpendicularly to the movement of the rods 44 and is arranged to actuate an arm 72 secured to the shaft 61. When the plunger 71 is depressed the lever 60 is moved in a counter-clockwise direction (Fig. 2) to the position shown in Fig. 3, wherein the stop finger 63 is withdrawn to permit the lowermost work blank to roll down the chute, and the stop finger 64 is raised to engage the succeeding work blank 41a and prevent the remainder of the work blanks from rolling down the chute. The released work blank 41 then rolls down into the carrier 40, in readiness to be transferred to the work supporting means. When the work carrier again moves downwardly the plunger 71 is released and the spring 65 rotates the lever 60 in a clockwise direction back to the position shown in Fig. 2, wherein the stop finger 64 is withdrawn and permits the work blanks to roll down against the stop finger 63.

The bracket 50 is preferably provided with arcuate slots 73 through which clamping bolts 73a extend so as to permit adjustment of the loading mechanism about the shaft 51 to adapt it for use with various sizes of work pieces. To adjust the final forward position of the work carrier, a stop device 74 is preferably secured to the rear ends of the rods 44 and is adapted to engage adjustable screw devices 74a mounted on the bracket 50. This also facilitates the use of the mechanism with various sizes of work pieces.

A mechanism for removing the finished work pieces from the work supporting means is preferably mounted in front of the machine and, as illustrated most clearly in Figs. 1 to 3, and 5 to 5b, comprises an extensible slightly inclined discharge guideway which is mounted in part on a bracket 76 secured to the bed 11. The guideway in its preferred form comprises a stationary portion or chute 77 and a slidable or extensible portion or chute 78. The chute 77 is in the form of a pair of parallel guides which are secured in their spaced relation by means of a cross head 77a (Fig. 5b) and is preferably supported by means of an adjustable pipe framework (not shown)

which stands on the floor. The slidable chute 78 is mounted on a pair of rods 79 which pass through a pair of lugs 80, secured to a short bar 81 mounted on the bracket 76, and also through a pair of bores 82 in the cross head 77ª. The rods are secured at their rear ends (right hand ends in Figs. 2, 3 and 5) to a cross head 85 secured to the slidable chute 78 which is also preferably in the form of a pair of parallel guides, as shown in Figs. 5ª and 5ᵇ. At their rear ends the guides forming the chute 78 have pins 86 riding in slots 87 in the side walls of the chute 77 so as to guide the slidable chute along the stationary one.

The unloading means is also preferably reciprocated by means of a pressure fluid. As disclosed herein, a piston 88 (Fig. 5) is slidably mounted in a cylinder 89 and is connected to the head 85 by means of a piston rod 90. The cylinder is of sufficient length to permit the piston to move the chute 78 from its withdrawn position, as shown in Fig. 2, to its operative position, as shown in Fig. 3, for the purpose of receiving a finished work piece.

As mentioned hereinbefore, the exemplary embodiment of the invention is particularly adapted for operating on pistons for internal combustion motors and tools are provided on the supports 18 and 24 suitable for turning and facing or grooving operations. Preferably the work driver 15 is of the form illustrated in Figs. 1, 6 and 7 so as to enable the blanks to be removed from the carrier 40 and chucked automatically by advancing the tail center 16. This driver comprises a body 100 having a plurality of spring pressed plungers 101 slidably mounted therein in peripherally spaced relation. Pins 102 engage in longitudinal recesses 103 in the plungers to limit their movement in the body and coiled springs 104 normally urge the plungers outwardly. These plungers are adapted automatically to conform to the internal irregularities of the work pieces so as to form a driving connection therewith. Thus, when used for mounting pistons, as illustrated in Figs. 6 and 7, certain of the plungers 101 interengage with the wrist pin bosses 105. Preferably the body 100 of the work driver is provided with an annular shoulder 106 against which the end of the skirt of the piston fits and also a cylindrical portion of reduced diameter 107 for centering the open end of the piston.

The tail center 16 is preferably arranged to be advanced and retracted longitudinally by means of pressure fluid. Thus as illustrated in Fig. 1, the sleeve 17 on which the center 16 is rotatably mounted, has a bore 110 forming a cylinder. A piston 111 is positioned in said cylinder and is secured against longitudinal movement in the tailstock 14 by means of an integral rod 111ª which passes through a bore in the end 17ª of the sleeve 17 and is secured to a head 14ª on the tailstock. A passage 112 is provided in the rod 111ª and communicates at one end with a port 114 adjacent the piston 111 for supplying or exhausting fluid to or from the right-hand end of the cylinder 110 (Fig. 1), and at its other end is connected to a fluid conduit 115. A passage 113 extends through the rod and piston for the purpose of supplying or exhausting fluid to or from the left-hand end of the cylinder 110 and is connected at its outer end to a fluid conduit 117. Thus, since the piston is stationary, by admitting fluid through the passage 113 to the left-hand end of the cylinder, the sleeve 17 and the tail center 16 are moved toward the left (Fig. 1), and by admitting fluid to the passage 112, the sleeve 17 is moved toward the right to retract the tailcenter.

The feed screws 20 and 29 for the tool supports are preferably driven from the spindle 13 through suitable gearing during the cutting operations, although during the rapid advance and return movements of the supports they may be driven by means including an auxiliary reversing electric motor. Fluid for actuating the piston and cylinder devices may be supplied by a suitable pump driven from the main motor 35, and these fluid operated devices are preferably controlled by means of valves which are actuated in proper sequence by cams driven either from the motor 35 or spindle 13. This enables the various parts of the machine to be properly timed so that, assuming the parts to be in the positions shown in Fig. 3, wherein the unloading guideway is extended to receive a finished piston, the tool support 18 is withdrawn longitudinally toward the tailstock, the tool support 24 is withdrawn rearwardly, and the carrier 40 is in its upper position, the operations are as follows: An ejecting member or rod 121 (Fig. 6) which extends through the spindle 13 and work driver 15 may be actuated by a suitable piston and cylinder device (not shown) and together with the tail center 16 is moved toward the right (Figs. 1 and 6) until the finished piston 41 is alined with the receiving chute 78, whereupon the rod 121 is quickly withdrawn to the left and the finished piston is allowed to drop into the said chute. The unloading chute 78 is then moved toward the left (Fig. 3) to the position shown in Fig. 2, whereupon the carrier 40 with a blank piston thereon is moved from the position shown in Fig. 3 to the loading position shown in Fig. 2. The tail center 16 is then advanced toward the left (Fig. 1) and after engaging the closed end of the piston continues its movement toward the left until the piston has been moved onto the work driver with the skirt thereof in abutment with the shoulder 106. The carrier 40 is then retracted during which movement the plate 45 hinges about the pivot pin 47 and slides across the under side of the piston. When the carrier reaches its withdrawn position the cam 70 operates the plunger 71 and permits another blank to roll down onto the carrier. The tool supports are then advanced to the work, and are thereafter moved at a feeding rate during the cutting operations. Upon the completion of the cutting operations the tool supports are withdrawn whereupon the finished piston is unloaded and removed as hereinbefore described.

The frame elements and tool supports carried thereby when positioned as disclosed herein not only are out of the way of the chips falling from the work, but also enable the tools and work to be readily inspected. Furthermore by operating the spindle in a clockwise direction the tool supports are in compression and support the tools rigidly. In addition to the construction and general arrangement of the frame elements and tool supports, the invention provides a simple and efficient mechanism for loading blank work pieces onto the work supporting means and for removing finished work pieces from the machine. It is apparent that with the transfer mechanism such as illustrated herein for carrying work blanks from an elevated supply chute downwardly between the tool supports to the work supporting means, the movements of the parts may be readily synchronized and may all be along substantially straight lines. This permits the use of simple reciprocating devices for actuating the transfer mechanism and yet provides an efficient means for loading the machine. Similarly the unloading mechanism is extremely simple in construction and may be readily synchronized with the other parts of the machine since there is ample clearance in the direction in which it is mounted. The unloading mechanism carries the finished work pieces off toward the front of the machine where they may be readily inspected.

The hollow base 10, chip pan 33, and guard 34 form an effective means for collecting the chips and cutter coolant.

I claim as my invention:

1. A lathe having, in combination, a bed, a headstock projecting upwardly from one end thereof, an overarm extending from the upper end of the headstock parallel to and above said bed, a work spindle rotatably mounted in the headstock below said overarm, a tailstock spindle rotatably supported in axial alinement with the headstock spindle, a rear tool slide mounted on the bed for movement transversely of the spindle, an inverted tool support slidable longitudinally on an under surface of said overarm, means for supplying work blanks to said spindles comprising a carrier slidably mounted to the rear of said overarm and above said rear tool slide for movement substantially radially of said spindles, means for reciprocating said carrier between a withdrawn position and a loading position, a slightly inclined chute for supplying blanks to said carrier when in its withdrawn position, means for transferring a blank from said chute to said carrier when the carrier is moved to its withdrawn position, and means for unloading finished work pieces from said spindles comprising a receiving chute slidably supported in front of and lower than said spindles for movement along a slightly inclined line from a withdrawn position away from the spindles to a receiving position wherein the rear end of the chute is under the finished work piece, and means for reciprocating said receiving chute.

2. A lathe having, in combination, a bed, a headstock projecting upwardly from one end thereof, an overarm extending from the upper end of the headstock parallel to and above said bed, a work spindle rotatably mounted in the headstock below said overarm, a tailstock spindle rotatably supported in axial alinement with the headstock spindle, a rear tool slide mounted on the bed for movement transversely of the spindle, a tool support slidable on a surface of said overarm, means for supplying work blanks to said spindles comprising a carrier slidably mounted to the rear of said overarm and above said rear tool slide for movement substantially radially of said spindles, means for reciprocating said carrier between a withdrawn position and a loading position, a slightly inclined chute for supplying blanks to said carrier when in its withdrawn position, means for transferring a blank from said chute to said carrier when the carrier is moved to its withdrawn position, and means for unloading finished work pieces from said spindles comprising a receiving chute supported in front of and lower than said spindles for movement from a withdrawn position away from the spindles to a receiving position wherein the rear end of the chute is under the finished work piece, and means for reciprocating said receiving chute.

3. A lathe having, in combination, a bed, a headstock projecting upwardly from one end thereof, an overarm extending from the upper end of the headstock parallel to and above said bed, a work support rotatably mounted in the headstock below said overarm, a rear tool slide mounted on the bed for movement transversely of the work support, a tool support slidable on an under surface of said overarm, means for supplying work blanks to said work support comprising a carrier movably mounted to the rear of said overarm and above said rear tool slide, means for reciprocating said carrier between a withdrawn position and a loading position, means for supplying blanks to said carrier when in its withdrawn position, and means for unloading finished work pieces from said work support comprising an extensible receiving chute supported in front of said work support for movement from a withdrawn position away from the work support to a receiving position wherein the rear end of the chute is under the finished work piece.

4. A lathe having, in combination, a headstock, a work supporting spindle rotatably mounted in said headstock, a bed extending laterally from said headstock with the forward face thereof positioned rearwardly of the spindle axis, a rear tool support slidable transversely on said bed, an overarm projecting from the upper portion of said headstock parallel with said bed and having an inclined slideway on its under surface, a tool support slidably mounted on said slideway for movement longitudinally of said spindle and carrying a tool adapted to engage the work a substantial distance above the horizontal center line thereof, means for supplying work pieces to a position above said rear tool support and to the rear of said spindle, reciprocatory means for carrying work pieces from said supply means to the spindle movable in a line approximately bisecting the angle between the two tool supports, and means for removing finished work pieces from the spindle comprising a receiving member positioned in front of and lower than said spindle and slidably supported for movement from a withdrawn position out of the way of chips falling from the work piece to a receiving position under the work piece.

5. A lathe having, in combination, a headstock, a work supporting spindle rotatably mounted in said headstock, a bed extending laterally from said headstock with the forward face thereof positioned rearwardly of the spindle axis, a rear tool support slidable transversely on said bed, an overarm projecting from the upper portion of said headstock parallel with said bed and having slideway thereon, a tool support slidably mounted on said slideway for movement longitudinally of said spindle, means for supplying work pieces to a position above said rear tool support and to the rear of said spindle, reciprocatory means for carrying work pieces from said supply means to the spindle, and means for removing finished work pieces from the spindle comprising a receiving member positioned in front of and lower than said spindle and slidably supported for movement from a withdrawn position out of the way of chips falling from the work piece to a receiving position under the work piece.

6. A lathe having, in combination, a headstock, a work supporting spindle rotatably mounted in said headstock, a bed extending laterally from said headstock with the forward face thereof positioned rearwardly of the spindle axis, a rear tool support slidable on said bed, an overarm projecting from the upper portion of said headstock parallel with said bed, a tool support slidably mounted on said overarm, means for supplying work pieces to a position above said rear tool support, reciprocatory means for carrying work pieces from said supply means to the spindle, and means for removing finished work pieces from the spindle.

7. A lathe having, in combination, a hollow base, a headstock, a work spindle rotatably mounted in said headstock, a carriage slideway positioned above the work spindle, an inverted carriage on said slideway, a bed extending laterally from said headstock and positioned rearwardly of said spindle so as to permit chips to fall downwardly into the base, a transversely movable rear tool support on said bed, means to rotate the spindle so that the pressure is downward on the rear tool support, means for reciprocating the rear tool support, means for reciprocating the inverted overhead tool support, a supply chute having its discharge end positioned above said rear tool support and rearwardly of said overhead tool support, means for transferring work pieces to said spindle from said chute, and means for removing finished work pieces from said spindle positioned in front of the spindle.

8. A lathe having, in combination, a hollow base, a headstock, a work spindle rotatably mounted in said headstock, a carriage slideway positioned above the work spindle, an inverted carriage on said slideway, a bed extending laterally from said headstock and positioned rearwardly of said spindle so as to permit chips to fall downwardly into the base, a rear tool support on said bed, means to rotate the spindle so that the cutting pressure is against the tool supports, means for reciprocating the rear tool support, means for reciprocating the inverted overhead tool support, a supply chute having its discharge end positioned above said rear tool support and rearwardly of said overhead tool support, reciprocatory means for transferring work pieces to said spindle from said chute, and means for removing finished work pieces from said spindle.

9. A lathe having, in combination, a hollow base, a headstock, a work spindle rotatably mounted in said headstock, a carriage slideway positioned above the work spindle, a carriage on said slideway, a bed extending laterally from said headstock and positioned rearwardly of said spindle so as to permit chips to fall downwardly into the base, means to rotate the spindle, means for actuating said support, a supply chute having its discharge end positioned rearwardly of said spindle, means for transferring work pieces to said spindle from said chute, and means for removing finished work pieces from said spindle positioned in front of the spindle.

10. In a lathe, in combination, rotatable work driving means, a plurality of tool supports, a slightly inclined work blank supply chute having its discharge end to the rear and above the axis of said work driving means, means to release work blanks singly from said chute, means movable substantially radially of the work driving means for carrying work blanks singly to the work driving means, and means for removing finished work pieces from the driving means including a slightly inclined chute extending forwardly from the driving means and withdrawable during the cutting operations.

11. In a lathe, in combination, rotatable work driving means, a plurality of tool supports, a work blank supply chute having its discharge end to the rear of said work driving means, means movable substantially radially of the work driving means for carrying work blanks singly to the work driving means, and means for removing finished work pieces from the driving means including a movably mounted chute extending forwardly from the driving means and withdrawable during the cutting operations, over which the finished work pieces are arranged to roll in order.

12. In a lathe, in combination, a work spindle, a work driver on said spindle having a plurality of spring pressed plungers adapted to conform to and interengage with irregularities on the interior of a work piece, a carrier movable radially of the spindle for positioning a work blank axially of the spindle, means for moving the blank axially into driving engagement with the work driver for the cutting operation and thereafter for withdrawing the finished work piece from engagement with the work driver, and means for receiving the finished work piece from the withdrawing means and removing it laterally.

13. In a lathe, in combination, a work spindle, a work driver on said spindle having a plurality of peripherally spaced spring pressed plungers adapted to interengage with irregularities on a work piece, a carrier movable substantially radially of the spindle for positioning a work blank axially of the spindle, means for obtaining a relative axial movement of the blank and the work driver in one direction to engage the blank with the driver, and in the opposite direction to disengage the blank from the driver, and means for receiving the finished work piece from said last mentioned means and removing it laterally.

14. A lathe having, in combination, a bed, a headstock at one end of the bed, a work spindle rotatably mounted in the headstock, a plurality of tool supports, means for loading blank work pieces onto said spindle comprising a supply chute positioned with its discharge end above and to the rear of the spindle axis, a reciprocatory carrier for transferring blanks from said chute to a position alined with the spindle, means for supporting said carrier and moving it along substantially a straight line radial to the spindle, and means for removing finished work pieces comprising a chute positioned in front of the bed and means for reciprocating said chute from a withdrawn forward position to an operative rear position wherein a portion of the chute extends under the finished work piece.

15. A lathe having, in combination, means for rotatably supporting and driving a work piece, means for supporting tools for operation on the work piece, mechanism for automatically transferring blank work pieces to said work supporting means, and mechanism for automatically transferring finished work pieces from said work supporting means, one of said mechanisms comprising a reciprocatory device mounted for movement substantially radially of said work supporting means rearwardly therefrom, the other of said mechanisms comprising a reciprocatory device mounted for movement substantially radially of said work supporting means forwardly therefrom, and a pair of pressure fluid operated motors, one for reciprocating each of said devices.

16. A lathe having, in combination, means for rotatably supporting and driving a work piece, a transversely movable rear tool support, a longitudinally movable overhead tool support, mechanism for automatically transferring blank work pieces to said work supporting means, and mechanism for automatically transferring finished work pieces from said work supporting means, one of said mechanisms comprising a reciprocatory device mounted for movement rearwardly from the work supporting means, the other of said mechanisms comprising a reciprocatory device mounted for movement forwardly therefrom.

17. A lathe having, in combination, means for rotatably supporting and driving a work piece, a first tool support, a second tool support, mechanism for automatically transferring blank work pieces to said work supporting means, and mechanism for automatically transferring finished work pieces from said work supporting means, one of said mechanisms comprising a reciprocatory device mounted for movement toward and from said work supporting means over one of said tool supports, the other of said mechanisms comprising a reciprocatory device mounted for movement toward and from said work supporting means under the other tool support, and means for reciprocating each of said devices.

18. A lathe having, in combination, a headstock, a work spindle rotatably mounted in said headstock, a carriage slideway positioned on one side and above the work spindle, an inverted carriage on said slideway, a bed extending laterally from said headstock, a tool support on said bed on the other side of the work spindle, means to rotate the spindle so that the cutting pressure is against the tool supports, means for reciprocating the tool support, means for reciprocating the tool carriage, mechanism for transferring work pieces to said spindle axis and mechanism for transferring finished work pieces from said spindle axis, one of said mechanisms comprising reciprocatory means movable along an inclined path from the spindle axis over the tool support, the other of said mechanisms comprising a chute extending from the spindle axis under said tool carriage.

19. A lathe having, in combination, a headstock, a work supporting spindle rotatably mounted in said headstock, a bed extending laterally from said headstock with the forward face thereof positioned rearwardly of the spindle axis, a rear tool support slidable transversely on said bed, an overarm projecting from the upper portion of said headstock parallel with said bed and having longitudinally extending ways on its under surface, and a tool carriage slidably mounted on said ways for movement longitudinally of said spindle, carrying a tool adapted to engage the work a substantial distance above the horizontal center line thereof and positioned so as to be in compression against the overarm during a cutting operation.

20. A lathe having, in combination, a headstock, a work supporting spindle rotatably mounted in said headstock, a bed extending laterally from said headstock with the forward face thereof positioned rearwardly of the spindle axis, a tool support slidable on said bed, an overarm projecting from the upper portion of said headstock parallel with said bed and having an inclined supporting surface thereon, and a second tool support slidably mounted on said surface and carrying a tool adapted to engage the work a substantial distance above the horizontal center line thereof.

21. A lathe having, in combination, a bed, a headstock at one end of the bed, a work spindle rotatably mounted in the headstock, a plurality of tool supports, means for loading blank work pieces onto said spindle, and means for removing finished work pieces from the spindle comprising a chute positioned in front of the bed, and means for reciprocating said chute longitudinally thereof from a withdrawn forward position to an operative rear position wherein a portion of the chute extends under the finished work piece on the spindle.

22. A lathe having, in combination, a bed, a headstock at one end of the bed, a work spindle rotatably mounted in the headstock, a plurality of tool supports, means for loading blank work pieces onto said spindle, and means for removing finished work pieces from the spindle, one of said means comprising a movably mounted chute on which work pieces are adapted to move in order, and and means for reciprocating said chute from a withdrawn position to an operative position wherein a portion of the chute extends under the work piece on the spindle.

23. A lathe having, in combination, a bed, means for rotatably supporting the work, a tool support, and means for handling work pieces comprising a movably mounted chute in which the work pieces move in order, and means for reciprocating said chute longitudinally from a withdrawn position to an operative position wherein a portion of the chute extends under a work piece carried on said work supporting means.

24. A lathe having, in combination, a headstock, a spindle rotatably mounted in said headstock on a horizontal axis, means for rotating the spindle in a clockwise direction when viewed from the right hand end of the lathe, a bed extending longitudinally from said headstock and positioned beneath and to the rear of the axis of said spindle, a tool support movably mounted on said bed, an overarm extending longitudinally from said headstock above said spindle, a tool support movably mounted on said overarm, said tool supports being positioned so as to be in compression against said bed and overarm during a cutting operation.

25. A lathe having, in combination, a headstock, a spindle rotatably mounted in said headstock on a horizontal axis, a bed extending longitudinally from said headstock and positioned entirely to the rear of the axis of said spindle so as to leave an open chip-receiving space beneath the spindle, and a tool support movably mounted on said bed and in compression against said bed during a cutting operation.

26. A lathe having, in combination, a headstock, a work supporting spindle rotatably mounted on a horizontal axis in said headstock, a bed extending from said headstock and positioned entirely to one side of the spindle axis and having a supporting surface thereon, a tool support movably mounted on said surface, a tool mounted on said support for engaging a work piece secured to said spindle, a frame element extending from said headstock above said spindle and having a supporting surface, a tool support movably mounted on said surface, and a tool mounted on said support for engaging a work piece secured to said spindle, said supporting surfaces being substantially perpendicular to tangents through the points of contact of said tools on said work piece and positioned so that the tool supports will both be in compression thereagainst during the cutting operation.

27. A lathe having, in combination, a headstock, a work supporting spindle rotatably mounted on a horizontal axis in said headstock, a bed extending from said headstock and positioned to one side of the spindle axis and having a supporting surface thereon, a tool support movable transversely on said surface, a tool mounted on said support for engaging a work piece secured to said spindle, a frame element extending from said headstock above said spindle and having a supporting surface thereon, a tool support movable longitudinally on said surface, and a tool mounted on said support for engaging a work piece secured to said spindle, said supporting surfaces being substantially perpendicular to tangents through the points of contact of said tools on said work piece and being positioned so that the tool supports will both be in compression thereagainst during the cutting operation.

28. A lathe comprising, in combination, a headstock, an overarm extending longitudinally therefrom and having a supporting surface inclined downwardly and rearwardly on an under side, a spindle rotatably mounted in said headstock below said overarm, a tool carriage movable longitudinally on said overarm and positioned so that the carriage will be in compression against the overarm during the cutting operation, a tool on said carriage arranged to engage the work, and means forming a container beneath the work for receiving chips.

29. A lathe comprising, in combination, a headstock, an overarm extending longitudinally therefrom and having a supporting surface inclined downwardly and rearwardly on an under side, a spindle rotatably mounted in said headstock below said overarm, a tool carriage movable longitudinally on said overarm, and a tool on said carriage arranged to engage the work above the axis thereof, said carriage being in compression against said overarm during the cutting operation.

30. A lathe comprising, in combination, a headstock, an overarm extending longitudinally therefrom and having a supporting surface inclined downwardly and rearwardly on its under side, a spindle rotatably mounted in said headstock below said overarm, a tool carriage movable longitudinally on said overarm, a tool on said carriage arranged to engage the work in front of the axis thereof, a horizontal bed extending longitudinally from said headstock to the rear of the spindle axis so as to be out of the way of chips from the tool on the carriage, a tool support, movably mounted on said bed, a tool mounted on said support, said tool support and carriage being in compression against said bed and overarm respectively during the cutting operation.

CLEMENT J. SCHROEDER.